(12) United States Patent
Lewak et al.

(10) Patent No.: US 9,355,139 B2
(45) Date of Patent: May 31, 2016

(54) PRE-CACHING

(75) Inventors: Jerzy Jozef Lewak, Del Mar, CA (US);
Krzysztof Lukasz Mazur, Cracow (PL)

(73) Assignee: SpeedTrack, Inc., Yorba Linda, CA (US)

( * ) Notice: Subject to any disclaimer, the term of this patent is extended or adjusted under 35 U.S.C. 154(b) by 0 days.

(21) Appl. No.: 13/240,899

(22) Filed: Sep. 22, 2011

(65) Prior Publication Data

US 2012/0296930 A1 Nov. 22, 2012

Related U.S. Application Data

(60) Provisional application No. 61/487,128, filed on May 17, 2011.

(51) Int. Cl.
*G06F 17/30* (2006.01)

(52) U.S. Cl.
CPC .... *G06F 17/30424* (2013.01); *G06F 17/30389* (2013.01)

(58) Field of Classification Search
CPC ............... G06F 17/30424; G06F 17/30389
USPC .......................................................... 707/769
See application file for complete search history.

(56) References Cited

U.S. PATENT DOCUMENTS

| | | | |
|---|---|---|---|
| 6,026,391 A * | 2/2000 | Osborn et al. | |
| 7,302,425 B1 * | 11/2007 | Bernstein et al. | |
| 8,082,342 B1 * | 12/2011 | Stolboushkin | 709/224 |
| 2002/0107835 A1 * | 8/2002 | Coram | G06F 17/30457 |
| 2003/0097357 A1 * | 5/2003 | Ferrari et al. | 707/3 |
| 2004/0236726 A1 * | 11/2004 | Ewing | G06F 17/3048 |
| 2006/0004710 A1 * | 1/2006 | Borthakur et al. | 707/3 |
| 2011/0055202 A1 * | 3/2011 | Heimendinger | 707/721 |
| 2012/0203578 A1 * | 8/2012 | Baggett et al. | 705/5 |

OTHER PUBLICATIONS

Nesime Tatbul, "QoS-Driven Load Shedding on Data Streams", 2002, pp. 566-576.*
Charu Aggarwal, "On Futuristic Query Processing in Data Streams", Feb. 20, 2009, pp. 1-18.*

* cited by examiner

*Primary Examiner* — Apu Mofiz
*Assistant Examiner* — Jared Bibbee
(74) *Attorney, Agent, or Firm* — Klein, O'Neill & Singh, LLP

(57) ABSTRACT

This disclosure addresses the need for pre-caching of database query results which in general is the caching of the results of query evaluation before they are needed. In certain embodiments of query evaluation, the computing time required to evaluate a query is dominated by the reverse query, the evaluation of which determines the available remaining selectors and the number of items associated with each. The time to compute this reverse query is on average approximately proportional to the number of matching items. This result is used as a very convenient method of determining, before evaluation, which conjunctive queries will take the most time to evaluate—the long queries. These long queries can then be pre-cached, making them available for faster responses when they are needed. Methods of using cached conjunctive query results to more quickly evaluate certain queries comprising the disjunctive Boolean operators are also described.

18 Claims, 7 Drawing Sheets

FIG. 2c

| Base Query | Selector | Frequency |
|---|---|---|
| Zero Selector Query | A | 8 |
| Zero Selector Query | B | 7 |
| Zero Selector Query | D | 7 |
| Zero Selector Query | C | 6 |

FIG. 4

| Base Query 402 | Selector 404 | Frequency 406 |
|---|---|---|
|  | A | 8 |
|  | B | 7 |
|  | D | 7 |
|  | C | 6 |
| B | D | 6 |
| A | C | 5 |
| A | B | 4 |
| A | D | 3 |
| AB | D | 3 |
| C | D | 2 |
| B | C | 1 |
| AB | C | 1 |
| AC | D | 1 |
| BC | D | 1 |

PRE-CACHING

CROSS REFERENCE TO RELATED APPLICATIONS

This application claims the benefit of U.S. Provisional Patent Application No. 61/487,128, entitled "Guided Information Access (GIA): Faceted Navigation Generalized", filed on May 17, 2011, and which is hereby expressly incorporated herein by reference in its entirety.

TECHNICAL FIELD

The present disclosure relates to storing database queries, and more specifically relates to pre-computing and pre-caching database queries.

BACKGROUND

As users come to expect faster performance from their computing devices, evolutionary advances of hardware are not always sufficient to meet the expectations of many users. Therefore efficiencies in software also receive a great amount of attention to improve the performance of computing devices, but some computing tasks are computationally intensive and will always take longer than average to complete. Rather than force a user to accept this reality, it may be possible to precompute the results of certain tasks. Caching of various data represents an example of precomputing or pre-performing certain tasks. Caching of data, in the context of this invention, means the saving of some identifier of the data and the results of all or part of the computed task. This saving can be in RAM, on disk, or in any other storage medium.

In some instances database queries are one such task that can be computationally intensive and result in long response times. As such, some have attempted to cache database queries. The typical caching of database search queries generally depends on user input to determine which queries (and their results) to cache. For example, typical caching may require user input or analysis of previous search queries to calculate which inputted search queries are the most popular. Alternatively all prior user queries may be cached and when the allocated cache space fills up those least often repeated may be removed. Queries (and their results) can be cached to provide better performance the next time the query is performed. In fact, in a typical relational database, this type of user action dependent caching is the only practical way to cache queries. This is because there is no practical way to determine if a query result is to be cached before a user has inputted that query. It would be an advantage to choose to cache only those queries that take the longest to compute. However this requires a practical way of estimating the response times to queries (without performing all of them, which is impractical) in order to then choose to cache those responses which take the longest time—the long query responses.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present disclosure describes practical methods of determining estimated response times of queries in any types of search system in which these methods can be applied, such as for example in searches using Guided Information Access (GIA) or Technology for Information Engineering (TIE), or in Faceted Navigation or Faceted Metadata Search systems, and in any other systems in which these methods can be used.

The present disclosure addresses the need in the art for database "pre-caching," which is in general caching, either on disk or in ram or both, the results of a query and a unique query identifier in a database prior to a user's input of the query. The present technology allows for the pre-caching of search queries (and their respective search results) initiated prior to and independent of user input of the queries to be cached. Methods, systems, and computer-readable media are disclosed for pre-caching search queries and their respective search results, wherein the pre-caching occurs before any search criteria relating to the query are inputted by a user.

Disclosed are systems, methods, and non-transitory computer-readable storage media for pre-caching. When query results are pre-cached in some embodiments, each query is assumed to result in two parts. The first is the list of matching items, called the forward query result, and the second, called the reverse query result, is the list of selectors with the counts of items associated with each selector (the term "selector" is equivalent to a search term). Each such count of items is called the frequency of the respective selector. In some embodiments, pre-caching is performed prior to and independent of user input (e.g., user search criteria). In some embodiments, a zero-selector query, the null query, is created and inserted into a priority queue as the first base query. Its results comprise the list of frequencies of every single selector. The next highest ranked (by frequency) query in the priority queue (which is a single selector query) is selected as the next base query. The frequency of the zero-selector base query is the number of total items in the database. Optionally, the non-null base query's frequency is checked to ensure that pre-caching this query is even worthwhile (e.g., check whether the base query's frequency is greater than some pre-determined number X). The base query's matching items are identified (e.g., using a forward query). Reverse queries are evaluated to determine all detail selectors additionally available to be selected in conjunction with the base query and the frequencies of each of these selectors represents the frequency of the derived query when the selector is conjoined with the base query. In all references to conjunctive queries we mean queries consisting of a plurality of selectors and the conjunctive Boolean operator, but also including the null query and every single selector query which require no Boolean operator. For the zero-selector (base) query, all of the selectors in the database are available for selection in conjunction with the zero-selector (base) query. Each of these selectors can form a derived query based off the zero-selector (base) query. Each derived query (and its frequency) can be inserted in the priority queue. Optionally, any derived query not worth pre-caching (e.g., having a frequency less than or equal to X) can be discarded. Optionally, any derived query that is a duplicate of another query in the queue can also be discarded. The priority queue is sorted by frequency such that the queries with higher frequencies are first. The queue can optionally be truncated such that only the first "N" number of queries remains in the queue (i.e., only the "N" queries with the highest frequencies remain). The process can end whenever there is a termination trigger/signal. Otherwise, it repeats with the next highest ranked query in the priority queue. For example, after selecting the zero-selector query as a base query, the next query to be selected is the single-selector with the highest frequency in the database. In some embodiments, once a next base query is selected, the previous base query remains in the same position in the queue and needs not be sorted again.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2c illustrates an exemplary data structure for a priority queue;

FIG. 4 illustrates an exemplary data structure for a priority queue; and

DETAILED DESCRIPTION

Various embodiments of the disclosure are discussed in detail below. While specific implementations are discussed, it should be understood that this is done for illustration purposes only. A person skilled in the relevant art will recognize that other steps and orders of steps may be used without parting from the spirit and scope of the disclosure.

The present disclosure addresses the need in the art for database "pre-caching," which is in general caching that occurs in a database prior to user input of the query proposed for pre-caching. The present technology allows for the pre-caching of search queries (and their respective search results) initiated prior to and independent of user input of the pre-cached queries. Methods, systems, and computer-readable media are disclosed for pre-caching search queries and their respective search results, wherein the pre-caching occurs before any search criteria associated with the proposed queries and results to be pre-cached are inputted by a user.

Figure 1:
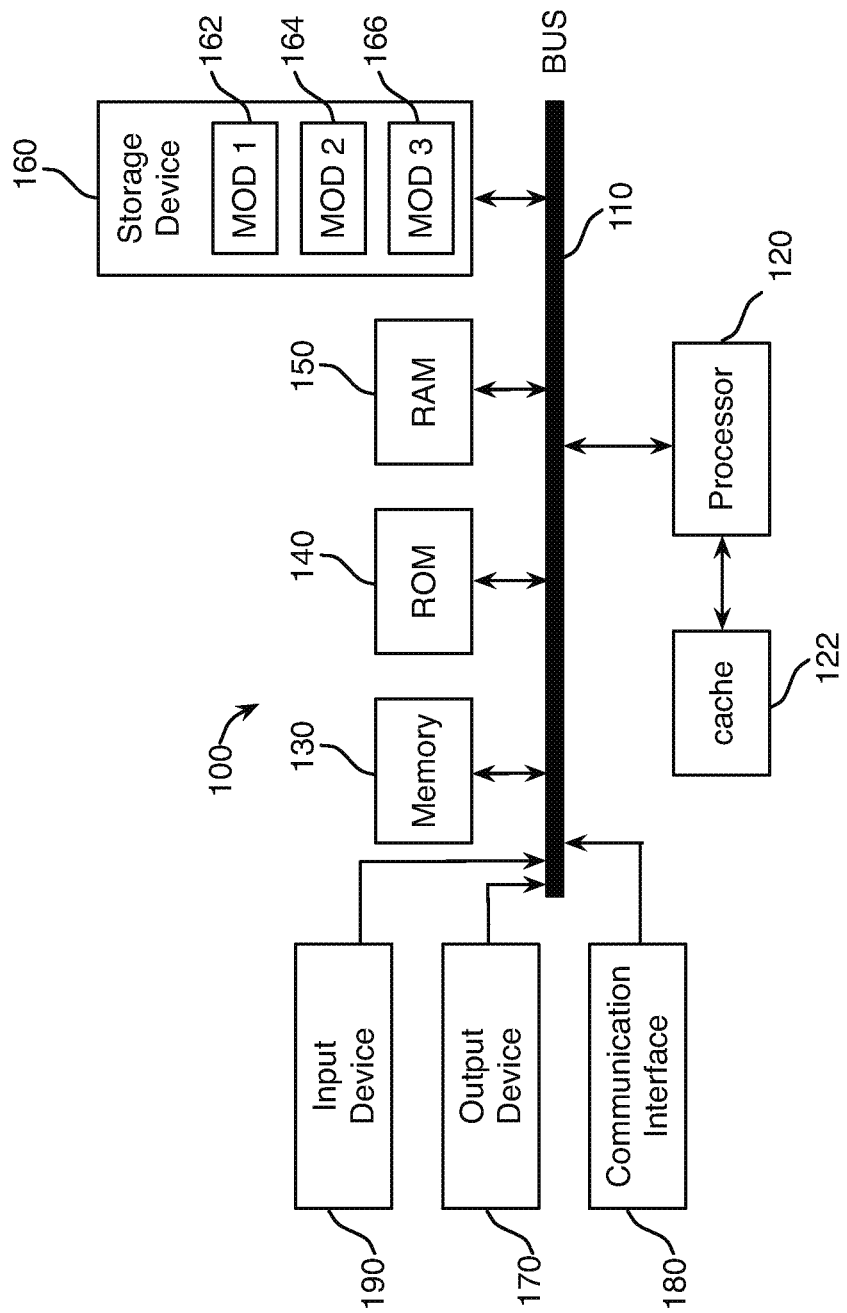
FIG. 1 illustrates an exemplary system embodiment.

These variations shall be discussed herein as the various embodiments are set forth. The disclosure now turns to FIG. 1. FIG. 1 illustrates an exemplary system 100 that includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, a computer server, or a client-server system connected across any local area, or wide area network in which the execution of method steps described herein may be partitioned between the client and the server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, solid state drives, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

The exemplary computing system discussed above can be used for pre-caching potential database responses. Typical caching generally does not allow for a practical way to determine the response times of queries (without performing them all, which is impractical), in order to then choose those queries that take the longest time to respond. However in systems in which the possible terms or values used to formulate the query are pre-defined or at least known, it is now practical to estimate and/or determine which queries will take the longest time to respond. Upon determining which queries will take the longest time to respond (i.e. the longest queries), these longest queries can be cached before ever requested be any user (i.e., pre-cached).

In some embodiments, pre-caching can be applied to a database implementing Guided Information Access (GIA), wherein the database utilizes associations between search results and search criteria. GIA allows a user to input his choice of search criteria by, for example, selecting certain "detail selectors," each of which can describe at least one resulting search "item." Detail selectors chosen by a user denote that user's choice of search criteria. A detail selector can describe a detail about or relating to an item. The results matching the query defined by the selected detail selectors and Boolean operators is called the Forward Query. (In GIA system the response to each query also involves the evaluation of the remaining available detail selectors and often the counts of associated items with each available detail selector. This is called the Reverse Query or the Facet refinement.)

When queries involve only conjunctions of selector combinations (in most data sets this is the most common query), the longest queries (apart from the zero selector query) are those consisting of just one selector. In a large GIA implementation the evaluation time of the response to a long query can require several seconds. The response times can be improved by pre-computing all the longest conjunctive query responses comprised of any number of selectors, for as many such long queries as resources are allocated for and caching them to disk and/or holding them in RAM when resources allow.

Such a pre-caching technique can substantially improve performance of the reverse query, because the great majority of the possible queries are not long so only a small minority substantially benefit from pre-caching.

Each response to a GIA query consists of two parts: the forward query response and the reverse query response. The forward response can obtain the list of matching items. The reverse query response can obtain the list of currently available selectors, each with its associated item counts—its item frequency. Selectors with zero item frequency are the unavailable ones and are commonly not displayed or distinctively displayed and not enabled for selection.

Most of the query response time can be attributed to the evaluation time of the reverse query. The reverse query evaluates item frequencies for which it has to check the associations of every matching item with each of the selectors. Therefore it is a good approximation to assume that a good response time measure for the reverse query is the number of matching items determined by the forward query.

In GIA systems queries are typically started by choosing one selector and then refining the query by adding other selectors to it, usually conjunctively, thereby narrowing the matching items. Each choice of a selector creates a query sent to the server which responds with the matching items and the list of available selectors with their new item frequencies. The item count (or item frequency) of a selector is the number of matching items that the forward query would determine if that selector were added conjunctively to the current query. The item frequency of a selector can be used as the estimate of the query response time for the query which would result if the selector were chosen to be conjunctively added to the present query.

Using this method, the resources allocated to pre-caching can be limited. The pre-caching method described herein starts with the longest queries (highest item frequency) and continues in order of frequencies until one of the configured available resource limits is exceeded. For example, as shown in Table 1, configuration resources such as: Disk space, RAM, Time, item frequency of selectors to be added to a base query, and Number of pre-cached Queries can be used to configure resource limits.

TABLE 1

| Config parameter | Value | Condition to limit queue length (L) |
|---|---|---|
| Number of queries to cache | N | L = N |

TABLE 1-continued

| Config parameter | Value | Condition to limit queue length (L) |
|---|---|---|
| Caching time | T | ? |
| Frequency limit | F | Last query to keep has freq. <= F and next lower freq. < F |
| Disk Space | D | ? |
| Length of queue | L | L |

Figure 2A:
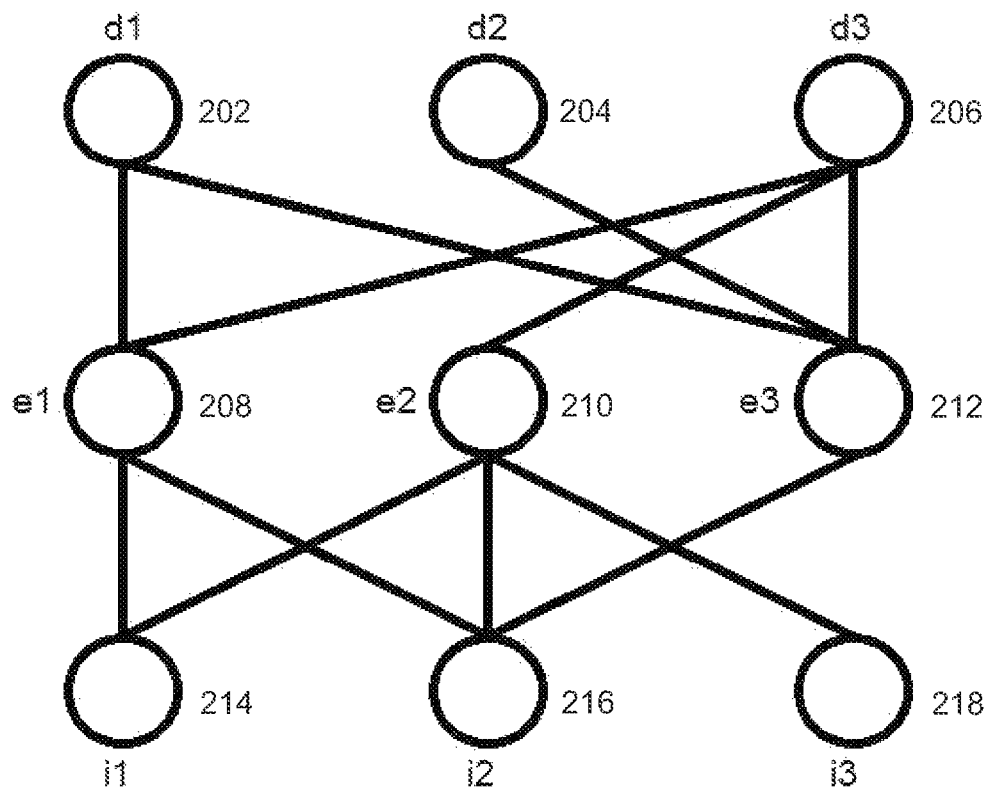
FIG. 2a illustrates an exemplary database representation with detail selectors, entities, and items.

FIG. 2a shows a small exemplary database with detail selectors, entities, and items. While this exemplary database includes entities, in some embodiments simpler databases having a direct association between the detail selectors and items are appropriate (see FIG. 2b). The detail selectors in this exemplary database in FIG. 2a are $d_1$ 202, $d_2$ 204, and $d_3$ 206; the entities are $e_1$ 208, $e_2$ 210, and $e_3$ 212; and the items are $i_1$ 214, $i_2$ 216, and $i_3$ 218. The selectors are terms that can be chosen by a user in forming a query. The items can be the results in the database, i.e., the results to be returned in response to a query. The entities can be the intermediate relationships which describe entities that might be related to an item and which the detail selectors can describe. In some embodiments, entities are a useful addition to a search system. The use of entities and counting items in databases using entity relationships are discussed in more detail in application Ser. No. 13/186,358 filed on Jul. 19, 2011, which is incorporated by reference herein, in its entirety.

Detail selector $d_1$ 202 has a matching item count (or item frequency) of two because it is uniquely associated with $i_1$ 214 and $i_2$ 216 (through $e_1$ 208 and $e_3$ 212). Thus, if a user would perform a single selector query by choosing only detail selector $d_1$ 202 they would obtain a result of two matching items $i_1$ 214 and $i_2$ 216 (via $e_1$ 208 and $e_3$ 212).

Figure 2B:
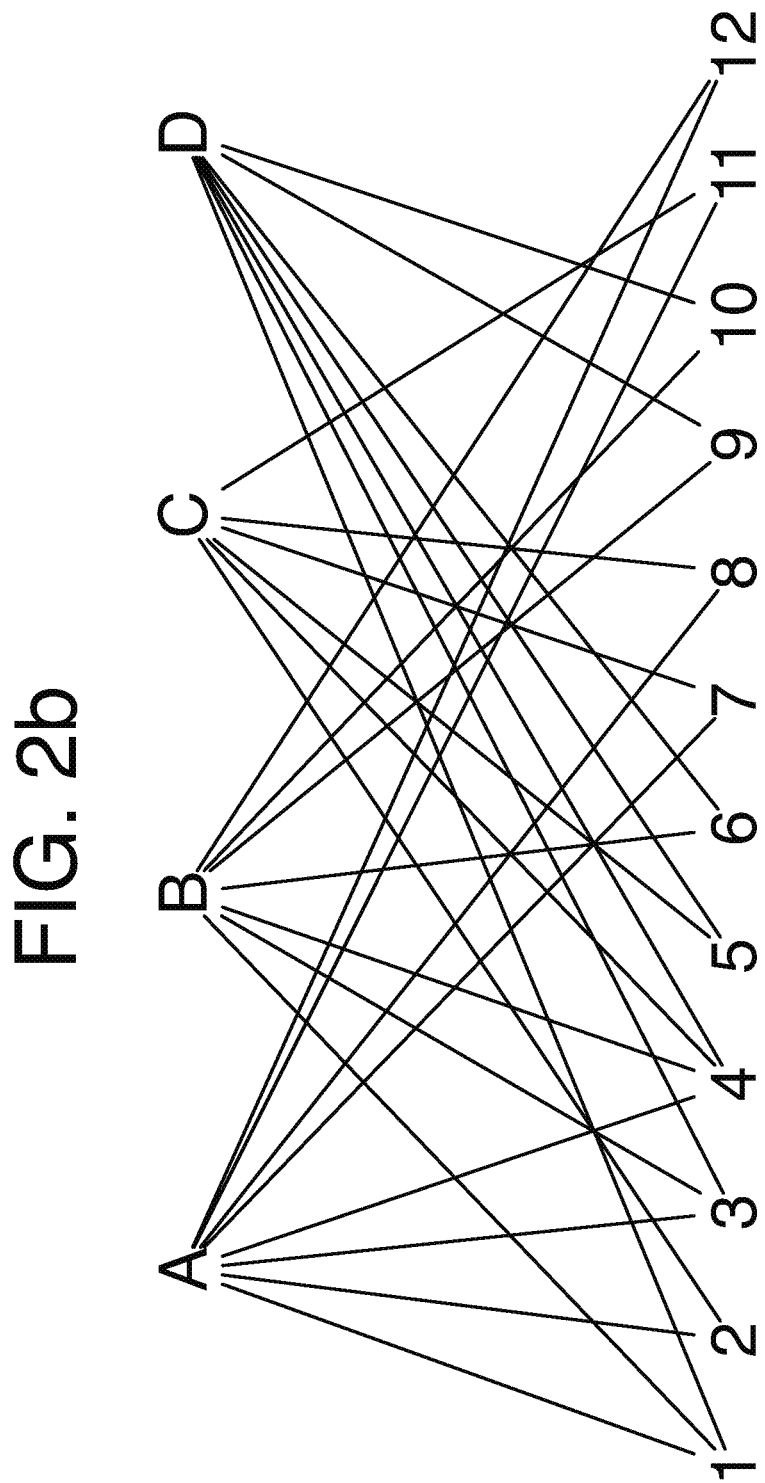
FIG. 2b illustrates an exemplary database representation with detail selectors and items.

To determine which single-selector queries should be pre-cached, after initialization when a zero-selector query is performed (before any selectors have been chosen), the reverse query result is put into an array of selector-ids each with its item frequency. The array gets sorted by item frequencies to get the most popular selectors (those with the highest item frequencies) first in the array. The array can be treated as a priority queue for performing single-selector query caches. For example, FIG. 2b illustrates another exemplary database showing the direct relationship from detail selectors A, B, C, and D to items 1-12. FIG. 2c illustrates a sorted queue of selectors and their item frequencies (counts of matching items) with respect to the database illustrated in FIG. 2b. In this example, the single-selector query based on selector A should be cached first because it has the largest result set and should be the longest query to computationally perform.

Just as it is possible to calculate the longest single-selector queries and pre-cache them it is also possible to calculate queries comprised of two or more selectors. Each possible two-selector query whose query frequency is greater than the limit set, can be created. The number of matching items (the item frequency) can be stored in an array which associates a query ID with the query frequency and the array sorted by item frequency to result in a sorted priority queue of queries. Again the query (whether single-selector or multiple-selector) with the largest query frequency should be cached first because it would be most likely the longest query to computationally perform, then the query with the next highest item frequency (whether single-selector or multiple-selector) should be cached, and so on.

The most expedient way of carrying out this method is to start with that single-selector query which has the highest frequency of matching items. The highest item frequency selector from the single-selector queue can first be combined conjunctively with another unique (available) selector to create two-selector queries. Adding a selector conjunctively to any query further narrows down the result set, or rarely leaves it unchanged. That means that a query composed of two selectors is of lower item frequency than, or rarely of the same item frequency as, either of the corresponding single selector queries. These two-selector queries can be created and inserted into the priority queue. For example, two-selector queries AB, AC, and AD can be created and inserted. The priority queue is sorted based on item frequency of the query (e.g., it is possible for a two-selector query to be ahead of a single-selector query if the two-selector query has a higher item frequency). The process repeats with the next query (the query with the next highest item frequency) in the queue. For example, if the next query is a two-selector query, then the two-selector query can be combined conjunctively with another single (available) selector to create three-selector queries. The three-selector queries can be created and inserted into the priority queue. The priority queue is sorted based on query frequency and the process repeats with the next query in the queue.

In the example given above, the single-selector query can be considered a base query, and the two-selector query can be considered a derived query because it is derived from the base query. Similarly, an "N"-selector query can be a base query for a derived "N+1"-selector query, and so forth. Each derived query is a conjunction of a base query with one additional selector. The derived query is therefore of lower, or at most equal, item frequency than (any selector in) the base query. (Equal query frequencies occur when the base frequency equals the derived query's frequency.) This means that any derived query should not be pre-cached before the queries of the detail selectors that, combined, make up the derived query. In general, any derived query should not be pre-cached before pre-caching its base query and the selector query for the selector added to the base query to arrive at the derived query.

Figure 3:
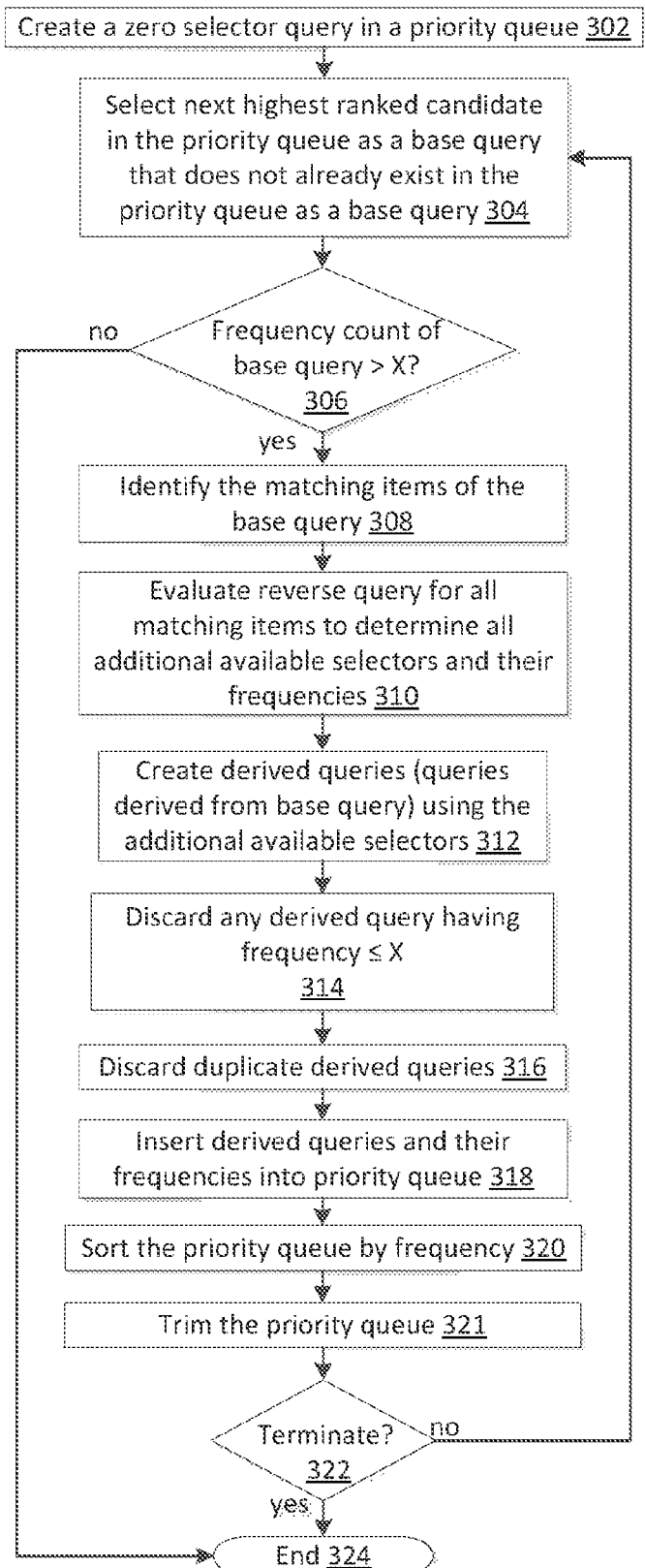
FIG. 3 illustrates an exemplary method embodiment.

FIG. 3 illustrates a method of determining which queries should be pre-cached and the order in which they should be pre-cached. As discussed above, usually upon database initiation, a zero-selector query is created (302) and placed in a priority queue. It is the only query in the priority queue and thus is the next highest ranked (based on query frequency) candidate. The zero-selector query is the initial (304) base query because it is the only query in the queue.

In some embodiments, a base query has too few items (small frequency) associated with it to warrant pre-caching. As such, the method can optionally check (306) whether the base query's frequency is greater than X (a determined/predefined number of items, above which, pre-caching makes sense). If the frequency is greater than X, a forward query is executed to identify the matching items (308) of the base query. In order to identify the available selectors and their item frequencies, a reverse query is evaluated (310). A derived query is created (312) for each of these selectors conjoined with the base query. Each derived query's frequency can be the matching item count for the conjunction of each of the selectors and the base query.

There can also be a determination of whether computing a particular derived query is even necessary and/or advantageous. As addressed above, the limit to the number of queries that can be pre-cached is based on available resources. In some instances the quick speed at which queries that will return only a small number of results can be processed does not justify the resources required to pre-compute, store, and maintain the results of those queries. One way to determine whether pre-caching is necessary/advantageous is to determine whether the base query is associated with a large enough result set to warrant pre-caching queries derived from the base query. Since a derived conjunctive query will necessarily have fewer (or sometimes the same) number of items as its base query, a particular derived query may have too few items (small frequency) associated with it to warrant pre-caching.

Accordingly, similar to the above discussion, the system can optionally have a determined/predefined frequency count (X, in FIG. 3), above which, pre-caching makes sense. The frequency count for each derived query can be checked to see if its frequency is greater than X (314). If a derived query (or the selector being conjoined with the base query to form the derived query) has a frequency count equal to or below the threshold X, then the derived query will not need to be pre-cached. Thus, those queries need not be placed in the queue (314).

Further, derived queries are also created to determine (316) if they are duplicates of queries already evaluated. If they are, they are discarded (316). Duplication of queries can come from two sources. First, duplication can be caused by adding to the base query one of the selectors already present in the base query. In some embodiments, this is avoided by first checking the base query before adding the next selector to it.

Duplication can also occur when the server is re-started after having previously performed some pre-caches and having additionally possibly cached user initiated queries. In some embodiments this kind of duplication can be avoided by using a hash table to keep track of all caches and checking that before a query is added to the queue. To keep track of each query it must be uniquely identified no matter how it is created. In conjunctive queries the order of the selectors is not important. Therefore the order of the query can be standardized (for example, sort it by any means, as for example by the selector ID, or selector name). Such standardized queries can then be used as keys in a hash table against which each new query can be checked.

Duplicate queries can be avoided by limiting queries to only those which add those selectors which would appear later in some chosen sorting order. Sorting can use any uniquely identifying attribute of each selector, but a preferred method assigns each selector a unique numeric ID and uses that for determining, in this context, the sorting order. The last ID (in general the last selector attribute used for sorting) can be the referenced query identifier in the queue array. This procedure can create queries with selectors of increasing sorting attribute and therefore will automatically avoid duplicate selectors within queries and multiple permutations of selector order within queries.

The derived queries (including their frequencies) are inserted into the queue, FIG. 3, at 318, and the queue is sorted by query frequency (320), such that the query with the highest frequency is first and that with the lowest frequency is last. In some embodiments, only the portion of the priority queue after the current base query needs to be sorted (i.e., all the queries after the current base query are sorted). In some embodiments, the queue can be truncated (321) after sorting such that only the first "N" number of queries remains in the queue (i.e., the "N" number of queries with the highest frequencies). If there is a termination trigger/signal (322) (e.g., the limit of resources allocated to caches is reached), then the method of this embodiment ends (324). Otherwise, the method repeats for the next query in the queue. An example of a priority queue with (derived) queries (including selectors and their frequency counts) resulting from a reverse query based off the zero-selector query for the database of FIG. 2b is illustrated in FIG. 2c. Each selector represents a potential single-selector query (i.e., each single-selector can form a query). The higher the frequency count for a selector, the greater the benefit from pre-caching a query based on (i.e., formed by) that selector. Thus, the order in which the selectors are listed in the sorted frequency table is the order in which queries should be pre-cached.

Each of the selectors listed in the frequency table can be used as a base query for more limited queries (e.g., derived queries). A possible optimal structure for the priority queue defines each query of k selectors in terms of a reference to the previously cached query of k−1 selectors, that is the base query. Each needed base query is already performed so it will never need to be resorted; it will always remain in the same position in the list.

These features make it possible to represent each (derived) query in the queue with a single selector element, a reference to the base query, and the frequency of the (derived) query. Therefore, as illustrated in FIG. 4, each element of the priority queue array includes an index to the base query 402, the selector to be added conjunctively to that base query 404, and the frequency of the new query 406. Reducing the components of each member of the queue down to only three makes the queue much more efficient and easier to memory manage. FIG. 4 illustrates a completed priority queue for the database in FIG. 2b. In some embodiments, the index to the base query 402 can be a sequential number (e.g., index/position number in the priority queue array).

One advantage of pre-caching methods is that they do not require the study of user query habits and query popularity to determine which queries are most beneficial to cache. However the disadvantage of this method on its own is that it can only be practical for conjunctive queries because if disjunctives are allowed the total number of high frequency queries becomes astronomically large for most practical database systems. However, as described herein, some disjunctive long queries can fruitfully use the pre-cached conjunctive query results to speed-up their evaluation.

There are several ways to configure the pre-caching limits. Table 2 shows one possible set of parameters that could be defined to limit the resources used for pre-caching.

TABLE 2

| Config parameter | Value | Condition limiting queue length (L) |
|---|---|---|
| Number of queries to cache | N | N given or estimated |
| Caching time | T | T <= elapsed time |
| Frequency limit | F | Last query to keep has freq. <= F and next lower freq. < F |
| Disk Space | D | N = Int(D/estimated size on disk of single query cache) |
| Length of queue | L | L = N |
| Long query evaluation time | t | s = next query evaluation time <= t |

Many combinations of these parameters may be specified. One possible embodiment could check the query queue during the process of creating it and terminate the query evaluation process when any one of the set limits, as a logical consequence, requires termination. In general the queue length may be limited (trimmed) to the number of queries to be cached. This number can be required to be provided as part of the configuration, it can be estimated, or some value based on experience of the particular data can be assumed as a default.

In order to allow for pre-caching even when any one, or even none of the parameters listed in Table 1 are defined, an estimation of N from other parameters can be evaluated. This estimate of a pre-cache limit could be performed in a number of reasonable ways.

For example, the following steps can estimate the number of queries to cache with none of the parameters specified:
(1) Check the available disk space (suppose it is d);
(2) Check the disk size of, for example, the 10 highest frequency query caches and deduce the average disk size of one cache (suppose it is c);
(3) Estimate of number of queries to cache is given by N=Int (0.1d/c).
This sets the disk limit on pre-caches as 10% of the available disk space. Other reasonable percentages could be used.

If the minimum long query evaluation time is specified or assumed to be some reasonable number guided by experience (say t) then the number of queries to pre-cache can be estimated as follows: Assume that the query evaluation time (s) is on average proportional to the frequency, that is s=kf, where k is some constant. Then an average k can be estimated from the first 10 or so query evaluations. Then the total query evaluation time is given by T=k times the sum of all query frequencies of queries to be evaluated, from the highest to the lowest one. This sum can be checked after each addition as it is preformed until the allocated time to pre-caching is reached. At that point the total number of queries whose frequencies were added, that is the number of queries, whose caching times accumulate to the allocated pre-caching time, can be determined and used as the estimated N. If the sum of decreasing query frequencies is S, then an estimate of the number of queries to cache (N) is the integer value of T/(kS).

Finally if only the frequency of the last query to pre-cache is specified, the number of queries to cache (N) can be estimated by checking the number of queries in the queue with frequencies greater, or equal to that frequency. For all estimates needing a query queue, the single selector query queue can be used.

Queries that comprise both conjunctive and disjunctive Booleans ("CD queries") can be split into a set of components each of which is a conjunctive or single selector query (we classify single selector queries as conjunctive). The results of these component queries can then be combined disjunctively. If the long component queries have been pre-cached, their results can be used and combined together with the remaining short queries instead of evaluating the query anew.

Illustrating one method of splitting a CD query uses the distributive property of the conjunctive operator. For example, using a capital letter to stand for a selector, the star ("*") to mean the conjunctive AND, the plus ("+") to mean the disjunctive OR, the Boolean A*B(C+D) becomes A*B*C+A*B*D. This is a disjunction of the two conjunctive queries: A*B*C, A*B*D. A*B*C and A*B*D will be called the component subqueries.

When a query such as A*B*C+A*B*D is initiated by a user, if either of the two subqueries is a long query already cached or pre-cached, the results of the caches can be used and combined together.

The query result generally consists of two parts when using TIE, GIA, or faceted navigation systems, but only one part when using a traditional text search. In TIE the matching items comprise one part and the available selectors the other, called the reverse query which is usually in the form of each selector's item frequency count of associated items, called the item frequency. In the case of a disjunction of the two conjunctions, the matching item set, the result of the forward query, is the union of the two matching item sets.

For example suppose the matching items resulting from the query A*B*C is the item set $IS_1=\{I_1, I_2, I_3, I_4, I_5, I_6, I_7\}$ and the matching items resulting from the query A*B*D is the item set $IS_2=\{I_1, I_2, I_8, I_9, I_{10}, I_{11}, I_{12}\}$. Then the union set is the result of the disjunctive combination of the two subqueries and is the set given by $IS_1+IS_2=\{I_1, I_2, I_3, I_4, I_5, I_6, I_7, I_8, I_9, I_{10}, I_{11}, I_{12}\}$.

The reverse query results, which are the item frequencies (item counts), can be obtained, by adding the reverse query frequency counts of the two subqueries and then correcting for double-counting of items using intersection set of the two matching item sets, that is the set IS1*IS2={I1, I2}, with the additional use of the item to selector matrix, as follows.

The reverse query results of the two subqueries may be represented as two selector item count tables, where in each table the first column identifies the selector and the second stores the associated item counts. The reverse query result of the disjunction of the two subqueries may be represented as another selector item count table, referred to as the CD table, to be completed with data from the other two tables.

Each row of a selector item count table represents a selector identified by the cell value in the first column. The second column contains the item count of that selector. In the CD table the second column in each row initially contains the sum of the two item counts from the corresponding rows of the two subquery tables. That summation of counts would be correct only if none of the matching items from IS1+IS2 were present in both IS1 and IS2. This is because those items present in both would have been counted twice. To correct for this, the technology can subtract one from each item count of selectors associated with those items present in both, that is with items in the intersection set IS1*IS2={I1, I2}.

To correct these counts, each item in the intersection set is looked up in the item-to-selector matrix. Then a traversal is made of the selector ID components of the corresponding item-to-detail-selector vector (an item row in this item-to-selector matrix being the item-to-selector vector) and a reduction of the associated selector's item frequency by one (1) is made for each traversed selector, that is for each nonzero component of the vector. Quite often when such CD queries are useful, there is very little overlap between the found items sets of each conjunctive subquery, which makes the reverse query response calculation shorter.

In general, in a CD query the disjunctives are parenthesized to ensure correct precedence in evaluation. In splitting CD queries, the parenthesized components, which can be individual selectors or conjunctively connected selector sets, can be expanded by distributing the conjunctive sets conjoined with the parenthesized expression as described above.

In some embodiments, a distribution may lead to more than two subqueries. For example, if there are three subqueries resulting in three sets of matching items (i.e., three item sets), say IS1, IS2, IS3, the items which must be used to reduce the summed item counts in the reverse query form two exclusive subsets: those that subtract one (1) and those that subtract two (2).

For example, let IS3={I1, I2, I8, I9, I13, I14}, then the two subsets are given by: X1=IS1*IS2*!IS3+IS3*IS2*!IS1+IS1*IS3*!IS2 (!IS1 means the complement set, that is all items not in IS1) which is the set of items counted twice, and X2=IS1*IS2*IS3, which is the set of items counted three times. Then all selectors associated with the items in X1 have 1 subtracted from their item frequency and those in X2 have 2 subtracted from their item frequency counts. In the symbolic example above, the sets are given by: X1={I8, I9} and X2={I1, I2}. For a more informative example, let us choose:
IS1={I1, I2, I3, I4, I5, I7};
IS2={I1, I2, I7, I8, I9};
IS3={I3, I4, I6, I7, I8}.

Then the two sets are given by: X1={I1, I2, I3, I4, I8} and X2={I7}. See FIG. 5.

Figure 5:
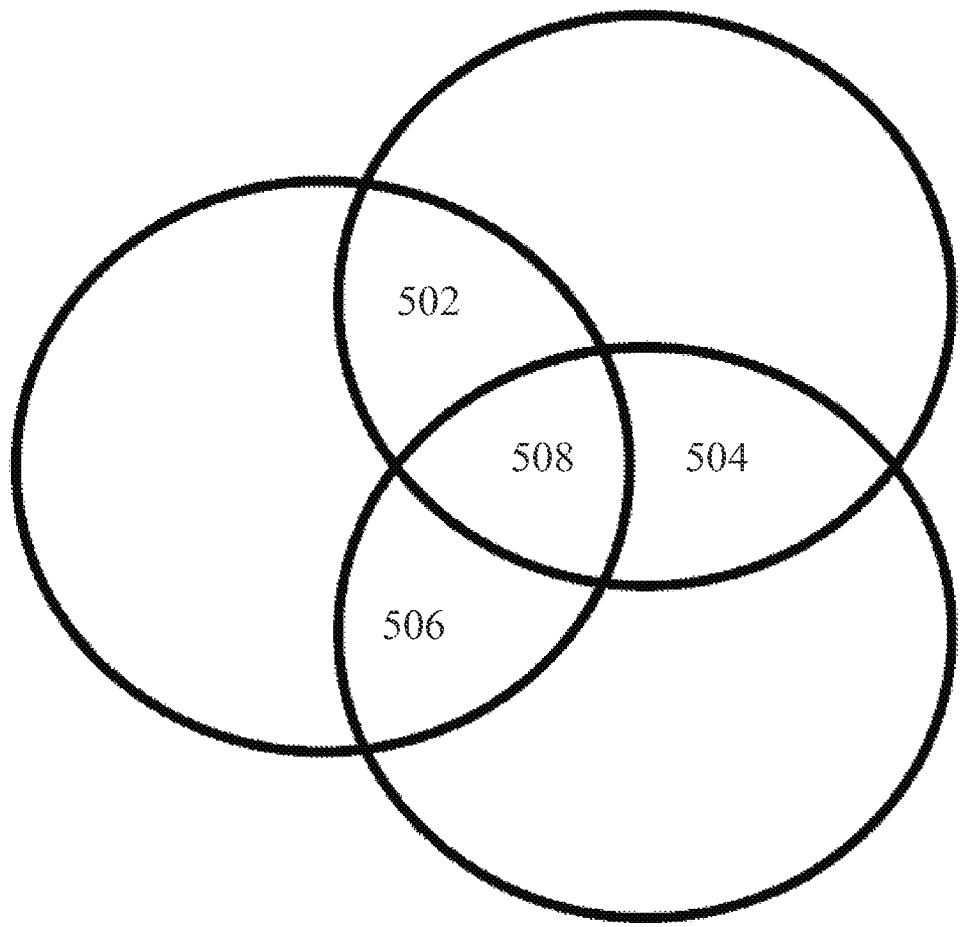
FIG. 5 illustrates an exemplary Venn diagram.

Referring to FIG. 5, each numbered region refers to the smallest closed region bounded by the curves. The region inside each complete circle represents the item set of each subquery (IS1, IS2, IS3). Then the set X1 is the sum or union set of the Venn diagram regions labeled as 502, 504, and 506, and X2 is the region labeled as 508.

The first set X1 represents item set intersections between two sets (and not a third set) and so each item from this set would subtract one from its associated selectors' item counts. The last one (e.g., X2) involves intersections between all three item sets and so item contributions from this set would need to subtract two from each item count of each associated selector(s).

If a query involves a parenthesized disjunction conjoined with another such expression, it leads to more than three sets which need to be intersected. This gives rise to three exclusive item sets needed in the adjustment to the sums of the item frequencies. In general, for cases involving a larger number of subqueries, all the possible intersections of the subquery matching item sets would have to be considered and the adjusting subtraction number would be one less than the number of the corresponding intersecting sets.

At some point it may become more efficient and certainly simpler, to evaluate the reverse query directly without trying to use any of the cached queries. In some cases some of the subqueries may not be cached while others may be cached. It may then be advantageous to evaluate the uncached subqueries directly and combine them with those in the cache.

The various embodiments described above are provided by way of illustration only and should not be construed to limit the invention. For example, the principles herein may be applied to, for example, a criminal database, a hospital database, a newspaper article database, a vehicle database, and/or another database a person having ordinary skill in this art would know. Moreover, the above example embodiments may be implemented slightly differently than described. For example, in some embodiments, it may not be necessarily to implement the Zero Selector. In some embodiments, the query string for detail selectors can, for example, be simplified to eliminate the "d" letter; for example, the query string "$d_1$" can simply be stored as "1" in the query string field. In some embodiments, a user can be any person or computer system, including part of any system, using the technology disclosed. In some embodiments, a different user is possible for each instance of the use of the term. Those skilled in the art will readily recognize various modifications and changes that may be made to the present invention without following the example embodiments and applications illustrated and described herein, and without departing from the true spirit and scope of the present disclosure.

In all methods described herein it is understood that computer software implementations of such methods may use unique identifiers, for example simple integers, to reference any element. When a method refers to an element, such a reference must be understood as optionally exactly equivalent to a unique identifier of said element. At times software implementations may use a unique identifier as a reference to the location of the true unique identifier of an element. These too should be considered exact equivalents to the element itself.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM, Solid State Drive, or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, such as, for example, programmable gate arrays, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A computer-implemented method comprising:
    determining for each of a plurality of potential database queries, of which at least one of which has not yet been inputted by a user and the results of at least one of these queries have not yet been pre-cached, an indication of estimated query response time using a count of items associated with a selector of each of the potential database queries;

based on the indication of estimated query response time of the potential database queries, determining a queue of potential database queries from which potential database queries should be chosen to have their results pre-cached;

executing at least some of the potential database queries from the queue; and pre-caching the results of the executed queries.

2. The computer-implemented method of claim 1, wherein the queue includes a potential database query and further potential database queries are chosen for the queue using a count of resulting search items associated with each of the further potential database queries.

3. The computer-implemented method of claim 2, wherein a priority order in the queue is based on the count of resulting search items associated with each of the further potential database queries.

4. The computer-implemented method of claim 1, wherein a priority order in the queue is based on the indication of estimated query response time of the potential database queries.

5. The computer-implemented method of claim 1, wherein the potential database queries comprise a conjunctive database query.

6. The computer-implemented method of claim 1, wherein each query in the potential database queries comprises a query derived from a base query such that the derived query can be uniquely identified by a single detail selector and the base query.

7. The computer-implemented method of claim 1, further comprising:

processing a query comprising a plurality of selectors, and at least one disjunctive Boolean operator, using results of one or more conjunctive or single selector queries which have been processed prior to creation of said query.

8. A system comprising:

a processor, the processor configured to perform a method comprising:

prior to a user request, determining, for a set of potential database queries at least so e of which have not yet been inputted by a user, an indication of query response time, using a frequency of items associated with each selector of each of the potential database queries;

creating a queue for potential database queries for which potential database query results should be pre-cached based on the indications of query response times;

executing the potential database queries in the queue; and pre-caching results of the executed queries; and a computer-readable storage configured to store a data structure representing the queue.

9. The system of claim 8, wherein the queue includes a potential database query and a further potential database query for the queue is chosen using a count of resulting search items associated with the further potential database query.

10. The system of claim 8, wherein the potential database queries in the queue are in a priority order, and the priority order is based on a count of resulting search items associated with the potential database queries.

11. The system of claim 10, wherein the count of resulting search items comprises an estimate of the amount of relative time required to process the potential database queries.

12. The system of claim 8, wherein a set formed of potential database queries comprises a query derived from a base query such that the derived query can be represented by an additional single detail selector while keeping track of the base query.

13. The system of claim 8, wherein a set formed of potential database queries comprises a query comprising a disjunctive Boolean query and the method further comprises:

separating disjunctive portions of the query into separate queries; and individually analyzing the separate queries.

14. The computer-implemented method of claim 7, wherein the query comprises only selectors and conjunctive and disjunctive Boolean operators, and an order for conducting operations.

15. The computer-implemented method of claim 7, wherein the results of the queries processed prior to the creation of said query have previously been cached.

16. The system of claim 10, wherein a set formed of potential database queries comprises a database query comprising a conjunctive Boolean query.

17. The computer-implemented method of claim 1, wherein a count of items matching the potential database queries is used to determine the priority order of the queue including a plurality of not yet processed queries.

18. The computer-implemented method of claim 1, wherein analysis of potential database queries uses a selector frequency result of a previously processed query to determine frequency of a selector which, when logically added to a previously processed query, creates a potential query.

* * * * *